US012688054B2

(12) United States Patent     (10) Patent No.:   US 12,688,054 B2

Banerjee et al.     (45) **Date of Patent:   \*Jul. 21, 2026**

(54) SYSTEM AND METHOD FOR DISTRIBUTED ORCHESTRATION MANAGEMENT IN NETWORK FUNCTION VIRTUALIZATION

(71) Applicant: VMware, Inc., Palo Alto, CA (US)

(72) Inventors: Sujeet Banerjee, Bangalore (IN); Sachin Thakkar, Palo Alto, CA (US); Sureshbabu Koyadan Chathoth, Bangalore (IN); Sachin Bendigeri, Bangalore (IN); Umar Shaikh, Bangalore (IN); Kiran Kumar Cherivirala, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 18/114,864

(22) Filed: Feb. 27, 2023

(65) Prior Publication Data

US 2023/0205569 A1     Jun. 29, 2023

Related U.S. Application Data

(63) Continuation of application No. 17/017,850, filed on Sep. 11, 2020, now Pat. No. 11,593,143.

(30) Foreign Application Priority Data

Jul. 30, 2020    (IN) ............................ 202041032775

(51) Int. Cl.
*G06F 9/455*     (2018.01)
*H04L 12/46*     (2006.01)

(52) U.S. Cl.
CPC .. *G06F 9/45558* (2013.01); *G06F 2009/4557* (2013.01); *G06F 2009/45595* (2013.01); *H04L 12/4641* (2013.01)

(58) Field of Classification Search
CPC ......... G06F 9/45558; G06F 2009/4557; G06F 2009/45595; H04L 12/4641
See application file for complete search history.

(56) References Cited

U.S. PATENT DOCUMENTS

| | | | |
|---|---|---|---|
| 2018/0018244 A1* | 1/2018 | Yoshimura | ............ G06F 9/5077 |
| 2018/0191581 A1* | 7/2018 | Yu | ......................... H04L 41/042 |

(Continued)

*Primary Examiner* — Michael W Ayers

(74) *Attorney, Agent, or Firm* — King Intellectual Asset Management

(57) ABSTRACT

A system and method for orchestrating distributed operations to be executed in a distributed computing system with multiple virtual infrastructures uses a distributed operation descriptor to find any Cloud-Native Network Function (CNF) entry in the distributed operation descriptor. For each found CNF entry, a CNF descriptor is retrieved from a CNF catalog and parsed to find an overridable property for a CNF described in the CNF descriptor for which a property override is defined. Then, a target virtual infrastructure is selected from the multiple virtual infrastructures to perform a lifecycle management operation of the CNF. Instructions are then transmitted to a local operator in the target virtual infrastructure with the property override so that information regarding the CNF is transmitted to a local orchestrator of the target virtual infrastructure to perform the lifecycle management operation of the CNF at the target virtual infrastructure using the property override.

20 Claims, 8 Drawing Sheets

(56)  References Cited

U.S. PATENT DOCUMENTS

| | | | |
|---|---|---|---|
| 2020/0228402 A1* | 7/2020 | Parker | G06F 9/54 |
| 2021/0117241 A1* | 4/2021 | Xia | G06F 9/45558 |
| 2021/0211392 A1* | 7/2021 | Thoppil | H04L 47/762 |
| 2022/0182923 A1* | 6/2022 | Yao | H04W 24/10 |

* cited by examiner

SYSTEM AND METHOD FOR DISTRIBUTED ORCHESTRATION MANAGEMENT IN NETWORK FUNCTION VIRTUALIZATION

RELATED APPLICATIONS

This application is a continuation, which claims priority from U.S. patent application Ser. No. 17/017,850, filed on Sep. 11, 2020, which claims benefit under 35 U.S.C. 119 (a)-(d) to Foreign Application Serial No. 202041032775 filed in India on Jul. 30, 2020, which are both herein incorporated by reference in their entireties for all purposes.

BACKGROUND

Network function virtualization (NFV) aims to virtualize the hardware control as well as data planes so network functions or services could be run on hypervisors or cloud infrastructures. European Telecommunications Standards Institute (ETSI) provides a set of open standards to specify capabilities, requirements and the means to orchestrate, deploy and lifecycle manage a set of network functions or services. ETSI have been following Topology and Orchestration Specification for Cloud Applications (TOSCA) as the specification language for the vendors to come up with Virtualized Network Functions (VNFs). This technology was primarily focused on deploying the network functions as virtual machines (VMs) on top of hypervisor technologies. As the name "TOSCA" suggests, it was built as a unified specification language for any/all cloud deployments. ETSI used TOSCA as their base for specifying standards for defining network functions (e.g., SOL-001 specification).

However, there are other vendor-specific extensions to TOSCA SOL-001 specification, e.g., Nokia CloudBand Application Manager (CBAM). Thus, these vendors have their own orchestrators that can interpret, deploy and lifecycle manage the vendor-specific packages.

In addition, there is a new "container" technology that promises fast deployments, and a plethora of other advantages compared to the hypervisor technology. This technology can be used to provide Cloud-Native Network Functions (CNFs), which are containerized applications that provide NFV capabilities. The advantages of this technology have resulted in an ecosystem of technologies, such as, Kubernetes, Docker and Helm charts, that help development, deployment and lifecycle-management of containerized applications. However, the specification for containerized applications are not bound by any standards body for unification, and often have cloud-native extensions based on the cloud provider (e.g., Google Cloud Computing (GCP), Amazon Web Services (AWS) and Microsoft Azure) and are rightly termed as cloud-native technologies.

Furthermore, there are still various network functions, which may not perform/scale in a virtualized platform. Such functions may better be deployed natively on a hardware platform. These functions are referred to as Physical Network Functions (PNFs).

An enterprise, such as telecommunication company, may have to deal with multiple vendors to build a network service comprising of Physical Network Functions (PNFs), Virtual Network Functions (VNFs) and or Cloud-Native Network Functions (CNFs). However, there are fundamental problems with a mix of these network functions. First, each technology has its own stack of implementations and specification, and thus, do not understand the other peer technologies. Second, each technology has its own pace of evolution and development; the CNF technology being the fastest and the PNF technology being the slowest. Third, most of the CNF technologies differ in some of the key aspects (e.g., deployment automation, telemetry, monitoring, Day-2 operational ease-of-use and upgrades) based on the provider of Cloud Infrastructure as a Service (IaaS). Fourth, there is no orchestrator today available that truly handles both CNFs and VNFs interacting with each other in their native ways (i.e., VMs on top of hypervisor, while containers on top of container-technology, or bare metal). Some of the platforms have at best remodeled or repackaged VNFs as containers to claim that they support both worlds. However, such approaches have left many caveats and performance issues, due to VMs running on top of hypervisor, further on top of container technology, thereby by having multiple layers of virtualization and context switching. Last, which is the greatest problem, the vendors provide their functions that are specific to a technology. For example, some of the network functions are available in PNFs, while some are based on the cloud type (e.g., Heat templates for Openstack deployments, or Helm charts for Kubernetes deployments). Thus, orchestrating the different types of technologies to build a network service is a challenging task.

SUMMARY

A system and method for orchestrating distributed operations to be executed in a distributed computing system with multiple virtual infrastructures uses a distributed operation descriptor to find any Cloud-Native Network Function (CNF) entry in the distributed operation descriptor. For each found CNF entry, a CNF descriptor is retrieved from a CNF catalog and parsed to find an overridable property for a CNF described in the CNF descriptor for which a property override is defined. Then, a target virtual infrastructure is selected from the multiple virtual infrastructures to perform a lifecycle management operation of the CNF. Instructions are then transmitted to a local operator in the target virtual infrastructure with the property override so that information regarding the CNF is transmitted to a local orchestrator of the target virtual infrastructure to perform the lifecycle management operation of the CNF at the target virtual infrastructure using the property override.

A computer-implemented method for orchestrating distributed operations to be executed in a distributed computing system with multiple virtual infrastructures in accordance with an embodiment of the invention comprises receiving a request to execute a distributed operation at a central orchestrator; in response to the request, retrieving a distributed operation descriptor for the distributed operation from a distributed operation catalog; parsing the distributed operation descriptor to find any Cloud-Native Network Function (CNF) entry specified in the distributed operation descriptor; and for each CNF entry found in the distributed operation descriptor: retrieving a CNF descriptor for the CNF entry from a CNF catalog; parsing the CNF descriptor to find an overridable property for a CNF described in the CNF descriptor; defining a property override for the overridable property; selecting a target virtual infrastructure from the multiple virtual infrastructures of the distributed computing system to perform a lifecycle management operation of the CNF; and transmitting instructions to a local operator in the target virtual infrastructure with the property override so that information regarding the CNF is transmitted to a local orchestrator of the target virtual infrastructure in order for the local orchestrator to perform the lifecycle management operation of the CNF at the target virtual infrastructure using the property override. In some embodiments, the steps of this method are performed when program instructions contained in a non-transitory computer-readable storage medium are executed by one or more processors.

A system in accordance with an embodiment of the invention comprises memory and at least one processor configured to receive a request to execute a distributed operation at a central orchestrator; in response to the request, retrieve a distributed operation descriptor for the distributed operation from a distributed operation catalog; parse the distributed operation descriptor to find any Cloud-Native Network Function (CNF) entry specified in the distributed operation descriptor; and for each CNF entry found in the distributed operation descriptor: retrieve a CNF descriptor for the CNF entry from a CNF catalog; parse the CNF descriptor to find an overridable property for a CNF described in the CNF descriptor; define a property override for the overridable property; select a target virtual infrastructure from the multiple virtual infrastructures of the distributed computing system to perform a lifecycle management operation of the CNF; and transmit instructions to a local operator in the target virtual infrastructure with the property override so that information regarding the CNF is transmitted to a local orchestrator of the target virtual infrastructure in order for the local orchestrator to perform the lifecycle management operation of the CNF at the target virtual infrastructure using the property override.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The embodiments of the invention are illustrated by way of example, and not by way of limitation, in the figures of the accompanying drawings in which.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
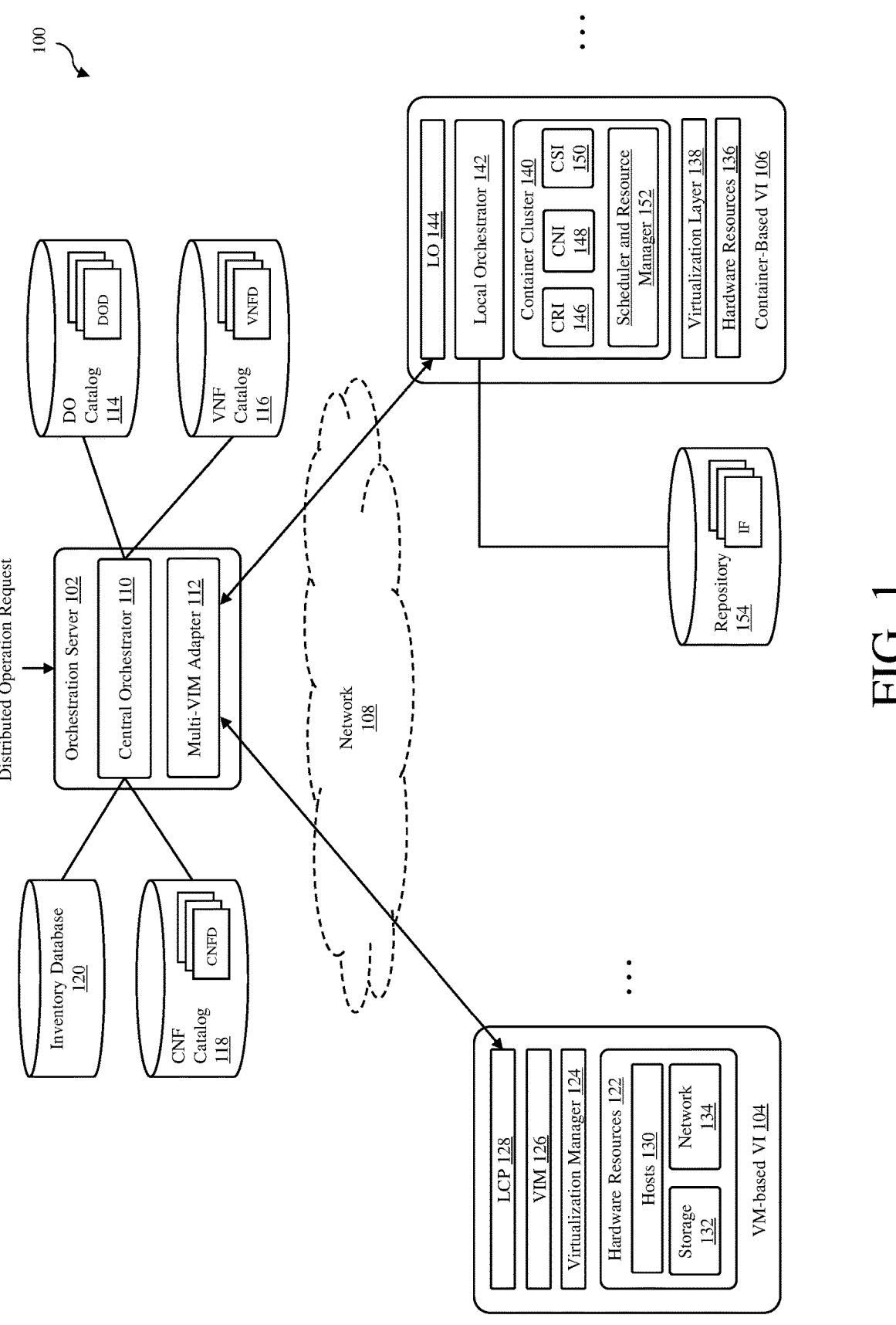
FIG. 1 is a block diagram of a distributed computing system with an orchestration server and multiple virtual infrastructures in accordance with an embodiment of the invention.

Turning now to FIG. 1, a distributed computing system 100 in which embodiments of the invention may be implemented. As shown in FIG. 1, the distributed computing system 100 includes an orchestration server 102 that is connected to a plurality of virtual machine (VM)-based virtual infrastructures (VIs) 104 and container-based virtual infrastructures (VIs) 106 through a communications network 108, which may be any communication network, such as the Internet. The virtual infrastructures 104 and 106 are computing environments that offer compute, storage and network as resources for hosting or deployment of services or applications, which may reside in one or more public clouds. Services/Applications The virtual infrastructures 104 and 106 are designed and implemented to support Virtual Network Functions (VNFs) and Cloud-Native Network Functions (CNFs), which are sometimes referred to as Containerized Network Functions. In particular, in the illustrated embodiment, the VM-based virtual infrastructures 104 support VNFs, while the container-based virtual infrastructures support CNFs. A VNF is a virtualization of a network function that can run in a hypervisor environment, which is realized as a virtual machine. A CNF is a containerized application that provides NFV capability. VNFs and CNFs can be used to deploy distributed operations, such as network service operations, in the distributed computing system 100. Thus, these distributed operations may require one or more VNFs and one of more CNFs, which may be deployed and managed in the various virtual infrastructures 104 and 106.

In a particular implementation, the distributed computing system 100 may be a telecommunication network, such as a 5G network, where the virtual infrastructures 104 and 106 provide network services to end users. The virtual infrastructures 104 and 106 may be deployed in different data centers, such as core data centers, regional data centers and edge data centers. Some of these data centers may include both types of the virtual infrastructures 104 and 106 to support VNFs and CNFs. In this implementation, the deployed VNFs and CNFs may provide services or functions that support network services. Examples of these services or functions include, but not limited to, User Plane Function (UPF), Enhanced Packet Core (EPC), IP Multimedia Subsystem (IMS), firewall, domain name system (DNS), network address translation (NAT), network edge, and many others. To achieve the speed and latency goals of 5G networks, some of these functions, such as UPF, need be deployed as close to the end users as possible.

If the distributed computing system 100 included only VM-based virtual infrastructures that support VNFs, then a unified orchestrator, such as a unified management and orchestrator (MANO) specified by European Telecommunications Standards Institute (ETSI), can be used as the central orchestrator to deploy and manage VNFs deployed in the various virtual infrastructures. However, such a unified orchestrator presents issues if one or more container-based virtual infrastructures that support CNFs are introduced because there are no standards with respect to orchestration for those type of virtual infrastructures. In such situations, each of these container-based virtual infrastructures may require a $3^{rd}$ party orchestrator running in that virtual infrastructure, which is unable to coordinate with the unified orchestrator and other $3^{rd}$ party orchestrators running in other container-based virtual infrastructures. In these environments, there are a few possible approaches to resolve these issues.

The first approach (approach-1) is to redevelop or remodel existing VNFs into CNFs, or use one common technology everywhere in the system. This would be done by the users themselves. However, this approach is practically impossible with newer technologies coming up fast in the market. Also, this approach may be unaffordable owing to the costs in terms of time and money required to acquire newer technologies, a skilled team and capital expenditure. In addition, some technology artifacts may not be portable to another technology.

The second approach (approach-2) is to develop a unified orchestrator (or platform) that will include converters or adapters for various technologies to remodel those into one of the technologies widely used. The heavy lifting in this approach would be done by the platform (as opposed to the user) that will convert the $3^{rd}$ party specifications and models, and re-catalog them natively in a master-catalog. The various $3^{rd}$ party specifications will be parsed, remodeled and converted into a common orchestration language, such as Topology and Orchestration Specification for Cloud Applications (TOSCA), followed by re-cataloging those in the master catalog that resides with the unified orchestrator. The unified orchestrator uses the master catalog to understand which pieces of orchestrations are to be translated back as workloads into the respective virtual infrastructures (e.g., compute, network and storage) and uses the adapters to micromanage those workloads.

An advantage of this approach is that there is a single point of interface for the user. Thus, the user does not have to interface with various $3^{rd}$ party orchestrators. The platform with the unified orchestrator does the heavy lifting of talking to multi-cloud, multi-vendor, multi-technologies.

However, there are several disadvantages with this approach as follows:

1) The platform requires an adapter for each $3^{rd}$ party technology and the adapters need to be kept updated, which is practically impossible for the platform provider to keep up with the pace of ever exploding set of technologies in this area. So, while there may not be adapters for many newer technologies, the same for other technologies (or virtual infrastructures) may become outdated fast.

2) There will be frequent upgrades required for the platform because a new adapter will require reconfiguration or update to some extent.

3) Not all technologies may be convertible 100% into another, which may lead to aberrations or undesirable behaviors that may be hard to detect or rectify.

4) Even if there exists an ideal unified platform, it may become a bottleneck, as the unified orchestrator does the micromanagement for the other $3^{rd}$ party orchestrators.

5) The $3^{rd}$ party catalogs need to be constantly synced to the master catalog. Failure in one such event may cause untraceable aberrations.

6) This approach could be seen as security threat if secrets/passwords that were managed in private $3^{rd}$ party catalogs are copied or moved to the mater catalog, which may be deployed on less secured premises (or demilitarized zones (DMZs)).

The third approach (approach-3) is to use a platform with a main orchestrator that dispatches all of the operations to the respective $3^{rd}$ party orchestrators. Thus, the main orchestrator follows a push mechanism to delegate the sub-orchestration to the corresponding virtual infrastructure in its entirety. In this approach, there is no remodeling and no micromanagement of the various virtual infrastructures. This is sometimes referred to as distributed orchestration. This approach is rather uncommon, compared to the approach-2.

This third approach rectifies many of the disadvantages of the approach-2, but brings other disadvantages. In particular, the user has to interface with more than one $3^{rd}$ party orchestrators in order to execute and manage distributed operations. So, there are multiple points of user interface required. This is due to the fact that the main orchestrator does not micromanage sub-orchestrations, which are handled by the respective virtual infrastructure native orchestrator (e.g., $3^{rd}$ party orchestrators). In addition, this approach requires a unified specification language that allows referencing (not remodeling as discussed earlier) 3$^{rd}$ party catalog entities, which is required for orchestration. Furthermore, this approach poses a challenge for resource sharing. For instance, if a single root I/O virtualization (SRIOV) network has to be share by VNFs and CNFs in multiple virtual infrastructures, the user has to specify the corresponding network identification (ID) to the 3$^{rd}$ party orchestrators for each of those virtual infrastructures, which must be repeated for each instantiation, and for each such shared resource (e.g., network, storage and memory).

So, while there are approaches to solve the problem, none of those are practically useful when it comes to these aspects:

1) Distributed operations, such as network service operation, that require VNFs, CNFs and/or PNFs with 3-rd party orchestrators hosted on multiple virtual infrastructures.

2) Resource sharing across functions that are scattered in multiple virtual infrastructures.

3) Multipoint user interfaces. That is, the user is required to provide the same set of inputs at multiple places that correspond to different virtual infrastructures.

As explained below, the distributed computing system 100 resolves at least some of these problems by using a variation of the push model discussed in the approach-3 for the container-based virtual infrastructures 106, where property override substitutions for CNFs are made at the orchestration server 102, which are then used at the container-based virtual infrastructures to execute operations associated with the CNFs. In addition, an intent in the form of a file (e.g., manifest, YAML or XML files) stored in one or repositories, which are accessible by the container-based virtual infrastructures 106, that are needed to execute the operations are not accessed by the orchestration server 102. Instead, references to the intent file is transmitted to the container-based virtual infrastructures 106 so that the 3$^{rd}$ party orchestrators at the virtual infrastructures can access and use the intent file. An intent is the desired effect and deployment is a realization of the intent. An intent with respect to CNFs may be instantiation of a CNF, termination of a CNF, re-instantiation of a CNF, scaling up/down a CNF, healing a CNF or upgrading a CNF, which are all lifecycle management operations.

Turning back to FIG. 1, the orchestration server 102 of the distributed computing system 100 provides a main management interface for users. As illustrated, the orchestration server 102 comprises a central orchestrator 110 and a multi-virtual interface management (multi-VIM) adapter 112. In an embodiment, the central orchestrator 110 and the multi-VIM adapter 112 are implemented as software running on any computer system.

The central orchestrator 110 operates to receive distributed operation requests, which may be network service requests, from users and relies on several data stores configured in non-volatile storage devices, to carry out its orchestration tasks. These data stores include a distributed operation (DO) catalog 114, a VNF catalog 116, a CNF catalog 118 and an inventory database 120. The DO catalog 114 is used to store distributed operation descriptors (DOD), such as network service descriptors (DSD), for different distributed operations (e.g., network services) that can be deployed or managed in the distributed computing system 100. The VNF catalog 116 is used to store VNF descriptors (VNFDs) to deploy VNFs in the virtual infrastructures 104. The CNF catalog 118 is used to store CNF descriptors (CNFDs) to deploy CNFs in the virtual infrastructures 106. The inventory database 120 is used to store inventory data relating to the virtual infrastructures 104 and 106.

Each VNF that needs to be deployed and managed to support distributed operations, such as network service operations, goes through an onboarding phase. The onboarding phase involves getting a VNF package from a vendor of the VNF. The VNF package includes a VNF descriptor (VNFD), a VNF manager, and element management system (EMS). A VNF descriptor is a file that describes the properties of the VNF, including resources needed (e.g., amount and type of virtual compute, storage, and network resources), software metadata (e.g., software version of the VNF), connectivity descriptors for external connection points, internal virtual links (typically realized using underlying software-defined networking (SDN) in a virtual infrastructure) and internal connection points, lifecycle management behavior (e.g., scaling and instantiation), supported lifecycle management operations and their operations, supported VNF specific parameters, and affinity/anti-affinity rules. As described above, VNF descriptors are stored in the VNF catalog 116. The VNF manager is proprietary software that the VNF vendor has developed for deploying the VNF onto conventional network virtualization function infrastructure (NFVI) and is optionally provided in the embodiments so that it can be used to deploy the VNF onto conventional VFVI. The EMS is also proprietary software that the VNF vendor has developed to manage the configuration of a VNF after a virtual machine for the VNF has instantiated. The virtual machine communicates with the EMS to receive initial configuration parameters as well as configuration changes during the lifecycle of the VNF.

An example of a VNF descriptor in TOSCA is shown below:

```
tosca_definitions_version: '1.0'
description: VNF 1
imports:
    - vmware_etsi_nfv_sol001_vnfd_2_5_1_types.yaml
topology_template:
    node_templates:
        VNF1:
            type: tosca.nodes.nfv.VMware.VNF
            properties:
                descriptor_id: vnfd_10c73f9c-78a1-4f65-afce-75d4618a950f
                provider: VMware
                vendor: VMware
                product_name: VNF1
                version: version
                id: id
                software_version: '1.0'
                descriptor_version: '1.0'
```

-continued

```
        flavour_id: default
        flavour_description: default
        vnfm_info:
           - gvnfmdriver
    requirements:
        - virtual_link: vnf1-ext-cp
vnf1-vdu:
    type: tosca.nodes.nfv.Vdu. Compute
    properties:
        name: vnf1-vdu
        description: vnf1-vdu
        vdu_profile:
           min_number_of_instances: 1
           max_number_of_instances: 2
        sw_image_data:
           name: Metaswitch-IMS-Dummy
           version: '1'
           checksum: checksum
           container_format: bare
           disk_format: qcow2
           min_disk: 4 GB
           size: 4 GB
    capabilities:
        virtual_compute:
           properties:
              virtual_cpu:
                 num_virtual_cpu: 1
              virtual_memory:
                 virtual_mem_size: 1024 MB
              virtual_local_storage:
                 - size_of_storage: 10 GB
vnf1-int-vl:
    type: tosca.nodes.nfv.VnfVirtualLink
    properties:
        description: vnf1-int-vl
        connectivity_type:
           layer_protocols:
              - ipv4
        vl_profile:
           min_bitrate_requirements:
              root: 10000000000
           max_bitrate_requirements:
              root: 10000000000
           virtual_link_protocol_data:
              - associated_layer_protocol: ipv4
                 l3_protocol_data:
                    name: vnf1-int-vl
                    ip_version: ipv4
                    cidr: 20.60.12.0/24
                    ip_allocation_pools:
                 - start_ip_address: ''
                    end_ip_address: ''
              dhcp_enabled: false
vnf1-int-cp:
    type: tosca.nodes.nfv.VduCp
    properties:
        description: null
        layer_protocols:
           - ipv4
        protocol:
           - associated_layer_protocol: ipv4
              address_data:
              - address_type: ip_address
                 l3_address_data:
                    ip_address_assignment: true
                    floating_ip_activated: false
                    ip_address_type: ipv4
                    number_of_ip_address: 1
        trunk_mode: false
    requirements:
        - virtual_binding: vnf1-vdu
           virtual_link: vnf1-int-vl
vnf1-ext-cp:
    type: tosca.nodes.nfv.VduCp
    properties:
        description: null
        layer_protocols:
           - ipv4
        protocol:
```

-continued

```
        - associated_layer protocol: ipv4
      address_data:
        - address_type: ip_address
          l3_address_data:
            ip_address_assignment: true
            floating_ip_activated: false
            ip_address_type: ipv4
            number_of_ip_address: 1
    trunk_mode: false
  requirements:
    - virtual_binding: vnf1-vdu
```

Each CNF that can be deployed or managed in the distributed computing system 100 to support distributed operations, such as network service operations, also goes through an onboarding phase. The onboarding phase for a CNF involves getting a CNF package to be stored in the CNF catalog 118. The CNF package includes a CNF descriptor (CNFD), which is a file that includes one or more references (e.g., names, identifications (IDs) or Uniform Resource Identifiers (URIs)) of at least one intent file (which may be a single file or a collection of files), a version and a list of overridable properties of the CNF. The type of intent files that are referenced will depend on the orchestration scheme that will be used for the CNF, such as Helm charts for Helm, Heat templates for Openstack, YAML files for Kubernetes systems and Kustomize for Kubernetes systems. The version of a CNF descriptor may include major and minor versions, which could be in a proprietary formal. The overridable properties of the CNF may be specified by {key: value}, where key indicates scheme specific key words, which the appropriate $3^{rd}$ party orchestrator understands, and value that represent a default, but can be overridden. These overridable properties will depend on the orchestration scheme that will be used for the CNF. Every orchestration scheme allows for property overrides. As an example, for Helm charts, properties in "values.yaml" file, or any environment properties can be overridden using "--set" or "--values" directive. For TOSCA templates, property overrides can be done through substitution mapping. For Heat templates, property overrides can be done using environment property overrides through "--parameter" directive. As described above, CNF descriptors are stored in the CNF catalog 116.

An example of a CNF descriptor in TOSCA is shown below.

```
tosca_definitions_version: tosca_simple_profile_for_nfv_1_0_0
description: Network Function description
imports:
  - vmware_etsi_nfv_sol001_vnfd_2_5_1_types.yaml
node_types:
  tosca.nodes.nfv.VMware.CNF.CNF1:
    derived_from: tosca.nodes.nfv.VMware.CNF
  tosca.nodes.nfv.Vdu.Compute.Helm.mysql:
    derived_from: tosca.nodes.nfv.Vdu.Compute.Helm
    properties:
      configurable_properties:
        description: Base Properties for Helm Overrides
        type: tosca.datatypes.nfv.VnfcConfigurableProperties.mysql_prop_overrides
        required: true
data_types:
  tosca.datatypes.nfv.VnfcConfigurableProperties.mysql_prop_overrides:
    derived_from: tosca.datatypes.nfv.VnfcConfigurableProperties
    properties:
      additional_vnfc_configurable_properties:
        type:
tosca.datatypes.nfv.VnfcAdditionalConfigurableProperties.mysql_prop_overrides
        description: Additional Deployment and Configuration Properties for 'mysql' Helm
Chart
        required: true
  tosca.datatypes.nfv.VnfcAdditionalConfigurableProperties.mysql_prop_overrides:
    derived_from: tosca.datatypes.nfv.VnfcAdditionalConfigurableProperties
    properties:
    persistence.enabled:
        required: true
        propertyName: persistence.enabled
        description: Overrides 'persistence.enabled' property in 'mysql' Helm Chart
        default: >-
            get_attribute(self.interfaces.Vnflcm.instantiate_start.outputs.OUTPUTVAR)
        type: string
        format: string
      some.other.example.prop1:
        required: true
        propertyName: some.other.example.prop1
        description: Overrides 'some.other.example.prop1' property in 'mysql' Helm Chart
        default: default_value1
```

-continued

```
                type: string
                format: string
            some.other.example.prop2:
                required: true
                propertyName: some.other.example.prop2
                description: Overrides 'some.other.example.prop2' property in 'mysql' Helm Chart
                default: default_value2
                type: string
                format: string
topology_template:
    substitution_mappings:
        node_type: tosca.nodes.nfv.VMware.CNF.CNF1
        properties:
            descriptor_id: vnfd_2a9c73b8-a146-4298-bb62-d529f657ace4
            provider: company_name
            vendor: MySql, Inc.
            product_name: My-SQL
            version: '1.0'
            id: id
            software_version: sample software_version
            descriptor_version: sample descriptor_version
            flavour_id: default
            flavour_description: default
            vnfm_info:
                - gvnfmdriver
        interfaces: { }
    node_templates:
        CNF1:
            node_type: tosca.nodes.nfv.VMware.CNF.CNF1
            properties:
                descriptor_id: vnfd_2a9c73b8-a146-4298-bb62-d529f657ace4
                provider: company_name
                vendor: company_name
                product_name: product_name
                version: '1.0'
                id: id
                software_version: software_version
                descriptor_version: descriptor_version
                flavour_id: default
                flavour_description: default
                vnfm_info:
                    - gvnfmdriver
            interfaces: { }
        cnf1-vdu1-mysql:
            type: tosca.nodes.nfv.Vdu.Compute.Helm.mysql
            properties:
                name: cnf1-vdu1-mysql
                description: MySql CNF VDU, that specifies Helm Chart name:'mysql', vesion: 1.6.2
                chartName: mysql
                chartVersion: 1.6.2
                helmVersion: v3
                id: cnf1-vdu1-mysql
                configurable_properties:
                    additional_vnfc_configurable_properties:
                        description: Property Overrides for 'mysql' Helm Chart
                        type:
tosca.datatypes.nfv.VnfcAdditionalConfigurableProperties.mysql_prop_overrides
                        persistence.enabled:
get_attribute(self.interfaces. Vnflcm.instantiate_start.outputs.OUTPUTVAR)
        cnf1-vdu1-ext-cp:
            type: tosca.nodes.nfv.VduCp
            description: This is the set of properties, which help the VDUI to reach/communicate
with External world (for example, via NS-VirtualLinks)
            properties:
                description: Property overrides for 'cnf1-vdu1-mysql', which correspond to cross-
linking with External Entities, e.g. VNFs, PNFs or Other CNFs
                another.example.network.prop1: default_val1
                another.example.network.prop2: default_val2
                mysql.layer3.protocol:
                    - associated_layer_protocol: ipv4
                        description: The Overrides could be a complex Object, as opposed to a 'String'
type.
                    address_data:
                        - address_type: ip_address
                        l3_address_data:
                            ip_address_assignment: true
                        floating_ip_activated: false
                        ip_address_type: ipv4
```

-continued

```
        number_of_ip_address: 1
   requirements:
       - virtual_binding: cnf1-vdu1-mysql
------------------------------------------------------------------------------------------------
```

In the above CNF descriptor example, there is a reference to Helm chart with its version and there are three overridable properties, which are identified as property overrides. As explained below, the reference and overridable properties specified in a CNF descriptor are used to delegate the orchestration task to a target container-based virtual infrastructure, where a lifecycle management operation for a CNF will be executed.

Each distributed operation, such as a network service operation, is defined by a distributed operation descriptor (DOD), such as a network service descriptor (NSD). Each distributed operation descriptor includes information about a distributed operation and one or more references to one or more VNFs and/or one or more CNFs to execute the distributed operation, which requires a lifecycle management operation of each of these VNFs and CNFs to be performed. A lifecycle management operation of a network function, either a VNF or a CNF, may be a deployment or instantiation of the network function, termination of the network function, re-instantiation of the network function, scaling up/down the network function, healing the function or upgrading the network function. For each VNF referenced, a distributed operation descriptor specifies at least a corresponding VNF descriptor and may specify one or more virtual links (typically realized using underlying SDN in a virtual infrastructure) required for the VNF. For each CNF referenced, a distributed operation descriptor specifies at least a corresponding CNF descriptor and may specify one or more virtual links required for the CNF and one or more overridable properties for the CNF. Thus, a distributed operation descriptor indicates the VNFs and CNFs needed for the distributed operation and shows where the descriptors for the needed VNFs and/or CNFs can be found in the VNF catalog 116 and/or the CNF catalog 118. Thus, distributed operation descriptors allow different network function types, such as VNFs, CNFs and even PNFs in some embodiments, to coexist and interact with each other.

Figure 2:
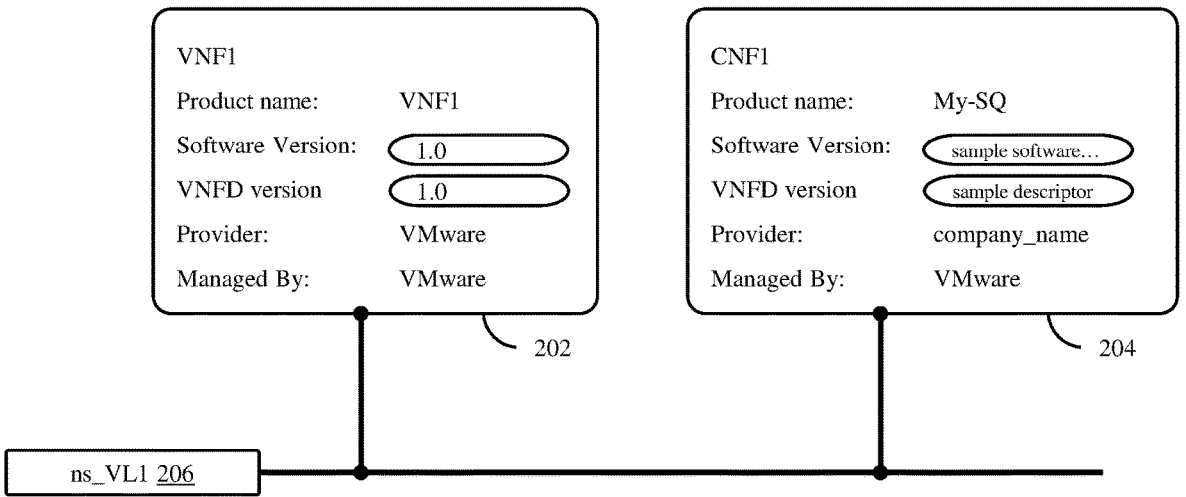
FIG. 2 illustrates an example of a distributed operation descriptor in the form of a network service descriptor being created on a graphic user interface in accordance with an embodiment of the invention.

A distributed operation descriptor may be created using a software tool that may provide a graphic user interface to add, delete and modify different VNFs and CNFs and any required virtual links for the VNFs and/or CNFs. An example of a distributed operation descriptor in the form of a network service descriptor being created on a graphic user interface is shown in FIG. 2. The network service descriptor being created includes one VNF 202 that is identified as "VNF1" and one CNF 204 that is identified as "CNF1", which are both connected to a virtual link 206 that is identified as "ns_VL1", which have been graphically entered by a user of the software tool. Once finalized, the network service descriptor that includes the VNF and CNF can be automatically generated by the software tool.

An example of a distributed operation descriptor is shown below. This example is the network service descriptor illustrated in FIG. 2.

```
------------------------------------------------------------------------------------------------
tosca_definitions_version: tosca_simple_profile_for_nfv_1_0_0
description: Example NS linking VNF1 and CNF1
imports:
    - vmware_etsi_nfv_sol001_nsd_2_5_1_types.yaml
    - vmware_etsi_nfv_sol001_vnfd_2_5_1_types.yaml
    - 5ae9a9ee-15ff-4719-be4d-bfbd7fe735bf/VNFD.yaml
    - 5ae9a9ee-15ff-4719-be4d-
bfbd7fe735bf/vmware_etsi_nfv_sol001_vnfd_2_5_1_types.yaml
    - ba375907-91da-4f9e-a536-358c9bf10b7d/VNFD.yaml
    - ba375907-91da-4f9e-a536-
358c9bf10b7d/vmware_etsi_nfv_sol001_vnfd_2_5_1_types.yaml
node_types:
    tosca.nodes.nfv.NS.NS-VNF1-CNF1:
        derived_from: tosca.nodes.nfv.NS
        interfaces:
            Nslcm:
                type: tosca.interfaces.nfv.Nslcm
data_types: { }
topology_template:
    substitution_mappings:
        node_type: tosca.nodes.nfv.NS.NS-VNF1-CNF1
        properties:
            descriptor_id: nsd_08213905-3a8f-4931-9ec0-3fbbe67ce5f5
            designer: 'VMware, Inc.'
            version: v.1
            name: NS-VNF1-CNF1
            invariant_id: 55b4d4f9-69ba-4249-abbd-b112e4d291a4
            flavour_id: default
        interfaces:
            Nslcm: { }
    node_templates:
        NS-VNF1-CNF1:
            node_type: tosca.nodes.nfv.NS.NS-VNF1-CNF1
            properties:
                descriptor_id: nsd_08213905-3a8f-4931-9ec0-3fbbe67ce5f5
                designer: 'VMware, Inc.'
```

-continued

```
        version: v.1
        name: NS-VNF1-CNF1
        invariant_id: 55b4d4f9-69ba-4249-abbd-b112e4d291a4
        flavour_id: default
      interfaces:
        Nslcm: { }
    VNF1:
      type: tosca.nodes.nfv.VMware.VNF
      properties:
        descriptor_id: vnfd_10c73f9c-78a1-4f65-afce-75d4618a950f
        id: 5ae9a9ee-15ff-4719-be4d-bfbd7fe735bf
        description: VNF 1
      vnfm_info: VMWARE
      requirements:
        - virtual_link: ns_VL1
    CNF1:
      type: tosca.nodes.nfv.VMware.CNF.CNF1
      properties:
        descriptor_id: vnfd_2a9c73b8-a146-4298-bb62-d529f657ace4
        id: ba375907-91da-4f9e-a536-358c9bf10b7d
        description: CNF1
      vnfm_info: VMWARE
      requirements:
        - virtual_link:
          name: ns_VL1
          properties:
            description: Properties to be overridden as a part of connectivity of the CNF to
the VL 'ns_VL1'. These properties could override the ones defined in the Connection
Points in the CNF Descriptor with the above descriptor_id
              another.example.network.prop1: override_val1
              another.example.network.prop2: override_val2
    ns_VL1:
      type: tosca.nodes.nfv.NsVirtualLink
      properties:
        description: NS Example VL linking VNF1 and CNF1
        connectivity_type:
        layer_protocols:
          - ipv4
        vl_profile:
        min_bitrate_requirements:
          root: 10000000
        max_bitrate_requirements:
          root: 10000000000
----------------------------------------------------------------------------------------------------
```

In the above network service descriptor example, two function entries "VNF1" and "CNF1" are listed under the heading "node_templates". Thus, when the network service descriptor is read, the central orchestrator 110 will know that there the network service requires a VNF and a CNF that are connected to a virtual line "ns_VL1".

For each distributed operation request, such as a network service request, that the central orchestrator 110 receives from a user, the central orchestrator 110 searches the distributed operation catalog 114 for a distributed operation descriptor corresponding to the request. Upon completing a successful search, the central orchestrator 110 retrieves the distributed operation descriptor from the distributed operation catalog 114 and extracts information it needs to carry out the request.

The information extracted from the distributed operation descriptor includes descriptor information of all of the VNFs and CNFs that are needed for the distributed operation. For all the VNFs identified in the distributed operation descriptor, the central orchestrator 110 retrieves into memory the corresponding VNF descriptors from the VNF catalog 116, and parses the VNF descriptors to extract information it needs to carry out the request. Similarly, for all the CNFs identified in the distributed operation descriptor, the central orchestrator 110 retrieves into memory the corresponding CNF descriptors from the CNF catalog 116, and parses the CNF descriptors to extract information it needs to carry out the request. In addition, the central orchestrator 110 may request user inputs for any property overrides for the CNFs, translate any virtual links required for the CNFs as property overrides and substitute property overrides using the user inputs and/or information derived from other sources, such as VNF descriptors specified in the distributed operation descriptor.

After extracting the necessary information from the VNF and/or CNF descriptors, the central orchestrator 110 generates commands for multi-VIM adapter 112 based on the extracted information and issues the commands to the multi-VIM adapter. The multi-VIM adapter 112 then generates a set of generic commands to be issued to various, selected virtual infrastructures 104 and 106 of the distributed computing system 100 where the VNFs or CNFs are to be deployed or managed.

The commands generated by the multi-VIM adapter 112 are generic in that the commands do not have to comply with any particular format required by the management software running the different virtual infrastructures 104 and 106. As such, the same set of commands may be sent to the different virtual infrastructures 104 and 106 running different types or versions of management software.

Each of the VM-based virtual infrastructure 104 includes hardware resources 122, a virtualization manager 124, a VIM 126 and a local control plane (LCP) 128. The hardware resources 122 includes host computers (hosts) 130, physical storage resources 132 and physical network resources 134, which may be provided by a cloud provider if the VM-based virtual infrastructure is deployed in a public cloud. Each of the hosts 130 includes hardware commonly found on a server grade computer, such as CPU, memory, network interface card and one or more storage devices. In addition, each host includes a virtualization layer that abstracts processor, memory, storage, and networking resources of the host's hardware into virtual machines that run concurrently on the host. In an embodiment, the virtual machines run on top of a hypervisor that enables sharing of the hardware resources of the host by the virtual machines. One example of a hypervisor may be used in the hosts is a VMware ESXi™ hypervisor provided as part of the VMware vSphere® solution made commercially available from VMware, Inc. The hypervisor of each host may run on top of the operating system of the host or directly on hardware components of the host.

The virtualization manager 124 of each virtual infrastructure 104 is a virtualization management software, which is executed in a physical or virtual server, that cooperates with hypervisors installed in the hosts 130 to provision virtual compute, storage and network resources, including virtual machines, from the hardware resources 122.

The VIM 126 of each virtual infrastructure 104 is a virtualized infrastructure management software, which is executed in a physical or virtual server, that partitions the virtual compute, storage and network resources provisioned by the virtualization manager 124 for different tenants. The VIM 126 also exposes the functionality for managing the virtual compute, storage and network resources, e.g., as a set of application programming interfaces (APIs), to the LCP 128 of the virtual infrastructure 104. The LCP 128 is a physical or virtual appliance that receives the set of generic commands from the multi-VIM adapter 112 of the orchestration server 102 and translates these commands into API calls that are recognizable by the VIM 126.

The LCPs 128 of the VM-based virtual infrastructures 104 in combination with the multi-VIM adapter 112 of the orchestration server 102 implement the functionality of multi-site virtual infrastructure orchestration of distributed operations, such as network services, with respect to VNFs. Each LCP may communicate with the multi-VIM adapter 112 using Internet-based traffic via a virtual private network (VPN) tunnel established between them, or alternatively, via a direct, dedicated link.

Figure 3:
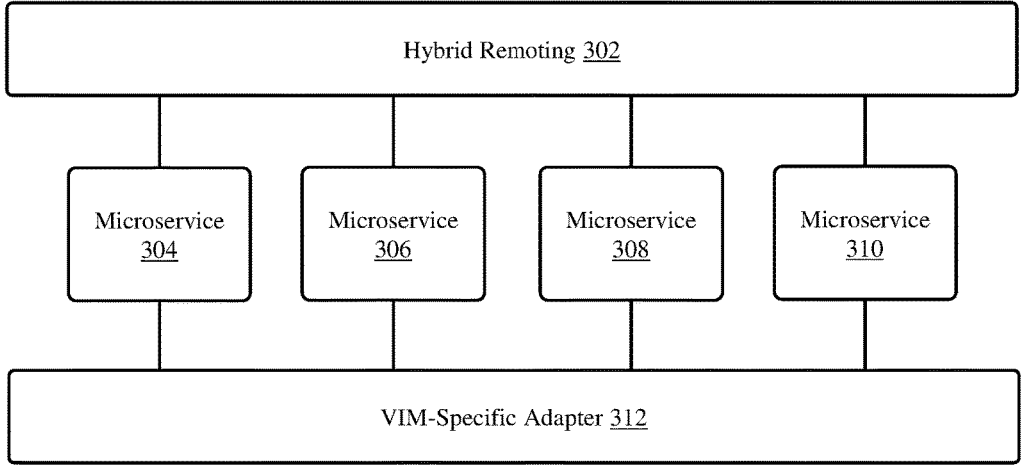
FIG. 3 is a block diagram of a local control plane (LCP) of some of the virtual infrastructures of the distributed computing system in accordance with an embodiment of the invention.

In an embodiment, as illustrated in FIG. 3, each LCP 128 includes a hybrid remoting service 302 for handling communications with the multi-VIM adapter 112. The hybrid remoting service 302 is responsible for breaking down the generic commands issued by the multi-VIM adapter 112 into instructions to be executed by worker nodes that are depicted in FIG. 3 as microservices 304, 306, 308 and 310. These microservices may be run in one virtual machine within individual containers, and translate a generic command with one or more parameters into one or more APIs in the format that is recognized by the underlying VIM to which a VIM-specific adapter 312 is connected. In one embodiment, the microservice 304 handles the translation of a generic command with one or more parameters into compute APIs recognized by the underlying VIM, and the microservice 306 handles the translation of a generic command with one or more parameters into storage APIs recognized by the underlying VIM. The microservice 308 handles the translation of a generic command with one or more parameters into network extension APIs recognized by the underlying VIM. The microservice 310 handles the translation of a generic command with one or more parameters into firewall configuration APIs recognized by the underlying VIM. Accordingly, the microservices perform a translation of a generic command into a domain specific command (e.g., API) that the underlying VIM understands. Therefore, the microservices that perform the translation for a first type of VIM, e.g., OpenStack, will be different from microservices that perform the translation for a second type of VIM, e.g., Kubernetes.

Each of the container-based virtual infrastructures 106 includes hardware resources 136, an optional virtualization layer 138, a container cluster 140, a local orchestrator 142 and a local operator 144. The hardware resources 136 include compute, network and storage resources, which may be provided by a cloud provider, to support containers deployed in the container-based virtual infrastructure 106. The optional virtualization layer 138 of each container-based virtual infrastructure 106 is virtualization software to provision virtual compute, storage and network resources for containers used in the container cluster 140 from the hardware resources 136. In some implementations, the container cluster 140 may run on bare metal.

In the illustrated embodiment, the container cluster 140 includes a container runtime interface (CRI) 146, a container network interface (CNI) 148 and a container storage interface (CSI) 150 that provide compute, network and storage resources for containers in the cluster. The container cluster 140 also includes a scheduler and resource manager 152 that controls resources for the containers in the cluster through policies and topology awareness. The container cluster 140 can be any type of a container cluster, such as Kubernetes (K8S) cluster or a Docker Swarm.

The local orchestrator 143 of each container-based virtual infrastructure 106 is a $3^{rd}$ party orchestrator that can deploy and manage CNFs in the container cluster. As an example, the local orchestrator may be, but not limited to, Helm, Kustomize, Tanzu Kubernetes Grid (TKG) or Pivotal orchestrator. The local orchestrator 142 may use one or more repositories 154 that store intent files, such as Helm charts, for CNFs to be deployed or deployed in the container cluster 140. Some of these repositories may be shared among some or all of the container-based virtual infrastructures 106. Although the local orchestrator 142 is illustrated in FIG. 1 as a single component, in some embodiments, the local orchestrator 142 may include other components that manage various aspects of the container cluster 140.

The local operator 144 of each container-based virtual infrastructure 106 functions as an interface between the central orchestrator 110 of the orchestration server 102 and the local orchestrator 142 of that container-based virtual infrastructure. Thus, the local operator 144 is configured or programmed to communicate with the associated local orchestrator 142, as well as the central orchestrator 110. The local operator 144 also performs tasks similar to the VIM of the VM-based virtual infrastructures 104, as described above.

When commands from the central orchestrator 110 are received at the local operator 144 via the multi-VIM adapter 112, the local operator 144 is able to translate the commands into instructions, such as API calls, that are understandable by the local orchestrator 142. In additional, when messages from the local orchestrator 142 are received by the local operator 144, the local operator 144 is able to relay the messages back to the central orchestrator 110 in a format and/or language that is understandable by the central orchestrator 110, which may or may not involve translating the messages from the local orchestrator 142 to a different format and/or language.

Figure 4:
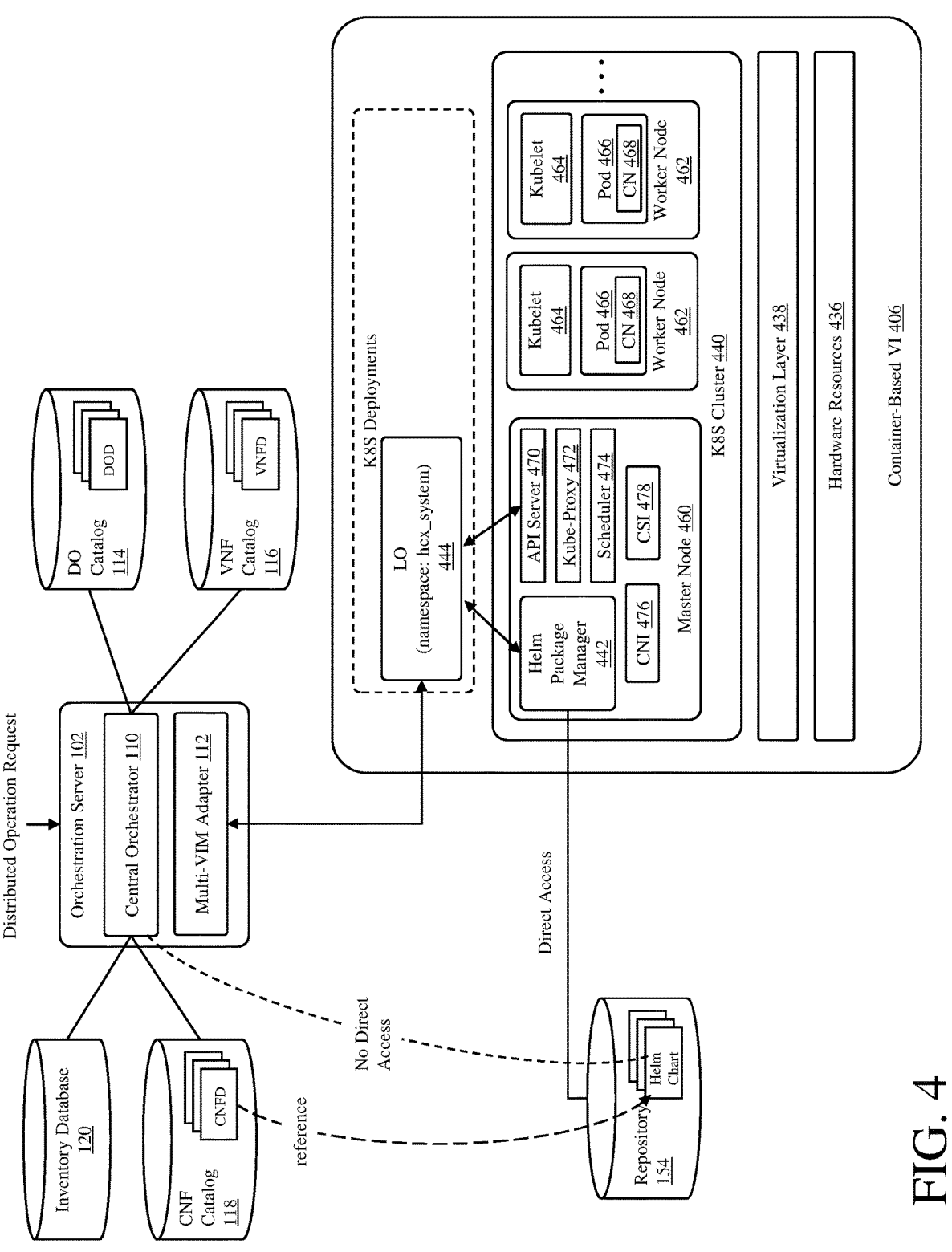
FIG. 4 is a block diagram of an example of a container-based virtual infrastructure of the distributed computing system in accordance with an embodiment of the invention.

Turning now to FIG. 4, the container-based virtual infrastructures 106 of the distributed system 100 are further described using an example of a container-based virtual infrastructure 406 with a Helm package manager 442 as the local orchestrator. As illustrated in FIG. 4, the container-based virtual infrastructure 406 includes hardware resources 436, an optional virtualization layer 438, a Kubernetes (K8S) cluster 440 with the Helm package manager 442 and a local operator 444. The hardware resources 436 include compute, network and storage resources, which may be provided by a cloud provider, to support containers deployed in the K8S cluster 440. The optional virtualization layer 438 of the container-based virtual infrastructure 406 is virtualization software to provision virtual compute, storage and network resources for containers used in the container cluster from the hardware resources 436. In some implementations, the container cluster may run on bare metal.

The K8S cluster 440 includes a master node 460 and a number of worker nodes 462. Each worker node 462, or worker compute machine, includes a kublet 464 that runs one or more pods 466 in the worker node. Each pod 466 may include one or more containers (CN) 468. The master node 460 includes an API server 470 and the Helm package manager 442. The API server 470 operates as a gateway to the K8S cluster 440, which can be accessed by users, automation and components in the K8S cluster. The Helm package manager 442 is a 3$^{rd}$ party orchestrator that can deploy and manage CNFs in the K8S cluster. The master node 462 may include other components, such as a kube-proxy 472, a scheduler 474, a CNI 476 and a CSI 478, which are well known components of a K8S cluster. The kube-proxy 472 is a Kubernetes network proxy that proxies User Datagram Protocol (UDP), Transmission Control Protocol (TCP) and Stream Control Transmission Protocol (SCTP), provides load balancing and can be used to reach services. There may be kube-proxy in each of the worker nodes. The scheduler 474 operates to make sure that the pods are matched to the nodes in the K8S cluster so that the kublets can run them. The CNI 476 and CSI 478 provide network and storage resources from the hardware resources 436 for containers in the K8S cluster.

In this embodiment, the local operator 444 is deployed as one of K8S deployments with a particular namespace, e.g., hcx-system. The namespace allows the local operator 444 to have defined privileges to communicate with components in the K8S cluster 440. Thus, the local operator 444 can communicate with the API server 470 and the Helm package manager 442 to orchestrate lifecycle management operations of CNF deployed or to be deployed in the K8S cluster 440.

As illustrated in FIG. 4, one of the CNF descriptors in the CNF catalog 118 includes a reference to a Helm chart in one of the repositories 154. However, the central orchestrator 110 does not have access to the repository. Thus, the central orchestrator 110 cannot retrieve needed Helm chart for the CNF. However, the Helm chart for the CNF can be accessed by the Helm package manager 442 of the container-based virtual infrastructure 406. Therefore, when a lifecycle management operation of the CNF is requested to be executed in the container-based virtual infrastructure 406, the central orchestrator 110 sends a command to the Helm package manager 442 via the local operator 444 with the reference to the needed Helm chart so that the Helm package manager 442 can retrieve the Helm chart from the repository 154 to execute the lifecycle management operation of the CNF. In this manner, the central orchestrator 110 delegates tasks for the lifecycle management operation of the CNF to the 3$^{rd}$ party orchestrator of a target container-based virtual infrastructure, which in this case is the Helm package manager 442 of the container-based virtual infrastructure 406. In addition, the CNF descriptor for the CNF may specify overridable properties of the CNF that are set or substituted by the central orchestrator 110 using property overrides, which are also sent to the Helm package manager 442 via the local operator 444 to be applied in the execution of a lifecycle management operation of the CNF. In an embodiment, the "property overrides" are optional features offered by the target container-based virtual infrastructure, which are then used by the central orchestrator 110 to support connectivity across CNFs and VNFs for distributed operations. In this manner, the central orchestrator 110 is able to oversee distributed operations that involve multiple VM-based and container-based virtual infrastructures without fully micromanaging the operations at all the virtual infrastructures.

Figure 5:
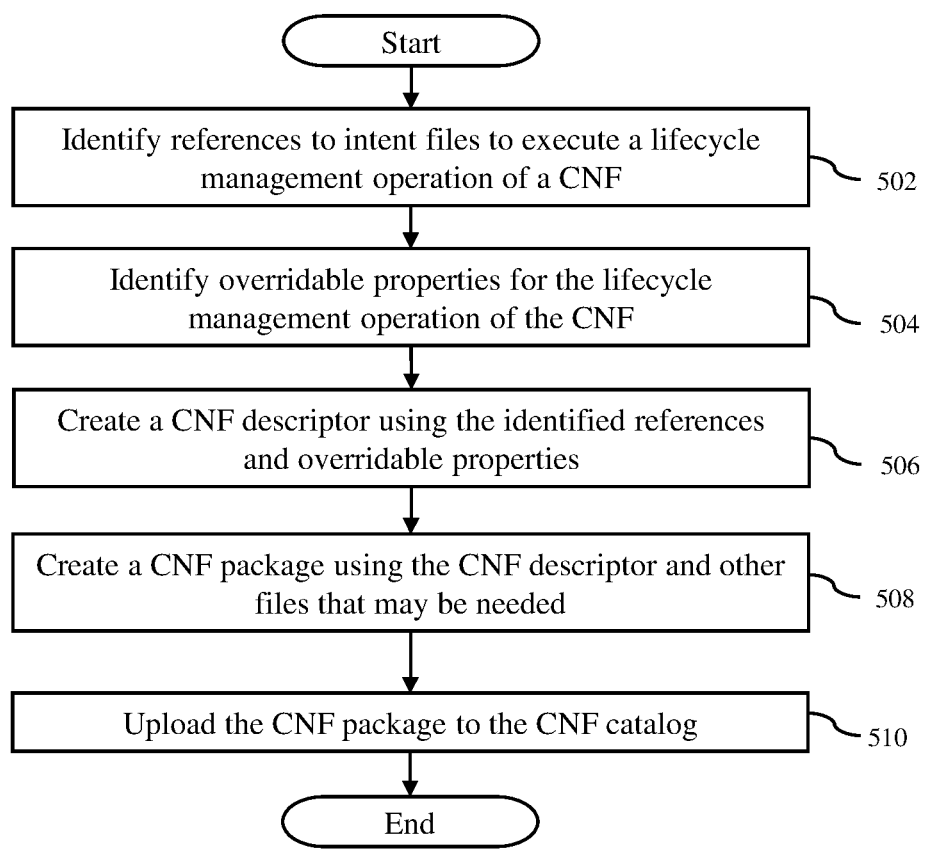
FIG. 5 is a process flow diagram of a process of onboard a particular Cloud-Native Network Function (CNF) package in accordance with an embodiment of the invention.

A process of onboard a particular CNF package in accordance with an embodiment of the invention is described with reference to a process flow diagram of FIG. 5. This process is typically executed when a new container-based virtual infrastructure is added to the distributed computing system 100. However, this process may be executed at any time.

The operation begins at step 502, where references to intent files, such as manifests, YAML and XML files, which are stored in the repositories 154, that are needed to execute a lifecycle management operation of a CNF in a particular container-based virtual infrastructure 106 are identified. Depending on the orchestration scheme utilized in the container-based virtual infrastructure, the intent files that are needed will differ. As an example, the intent files may be Helm charts, Heat templates, BPM scripts, Ansible scripts that can manage containers or Kustomize. In some embodiments, these references are provided by the vendor of the container-based virtual infrastructures.

Next, at step 504, overridable properties that available for the lifecycle management operation of the CNF in the container-based virtual infrastructure are identified. These overridable properties may be output as a property bag or file of overridable properties. In some embodiments, these overridable properties are provided by the vendor of the container-based virtual infrastructure. In other embodiments, sophisticated techniques, such as machine learning, may be used to intelligently and/or automatically pick or add overridable properties based on previous onboarding operations.

Next, at step 506, a CNF descriptor is created on any computer system using the identified references and the overridable properties as inputs for the CNF descriptor. In addition, a name or ID and the version of the CNF descriptor may be included in the CNF descriptor. The CNF descriptor may be similar to the CNF descriptor example in TOSCA shown above.

Next, at step 508, a CNF package is created on any computer system using the CNF descriptor and other files that may be needed, for example, as required by standards. In an embodiment, the CNF package is an archive file that includes multiples files, including the CNF descriptor. As an example, the CNF package may be a Cloud Service Archive (CSAR) file.

Next, at step 510, the CNF package is uploaded to the CNF catalog 118 using any computer system. In an embodiment, steps 508 and 510 may be performed by the provider of the orchestration server 102 and the associated catalogs.

Once the CNF package is stored in the CNF catalog 118, the central orchestrator 110 is able to access and use the CNF descriptor of the CNF package to deploy and manage the CNF in an appropriate container-based virtual infrastructure.

The process of onboard VNF packages are known, and thus, is not described herein in detail. Typically, VNF packages are provided by vendors of VNFs, and thus, are simply uploaded to the VNF catalog 116 to be used by the central orchestrator 110.

Figure 6:
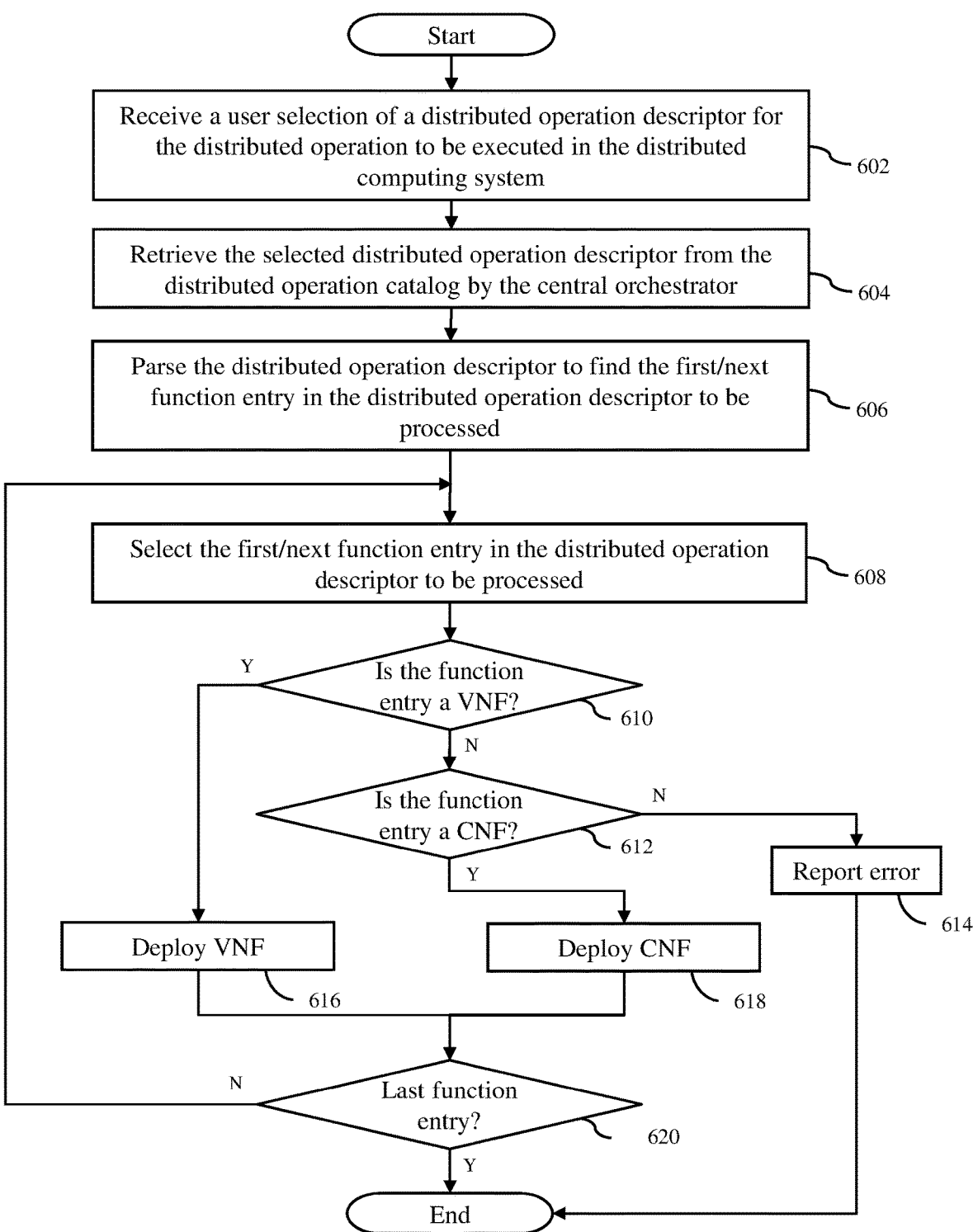
FIG. 6 is a process flow diagram of a process of executing a distributed operation, such as a network service operation, in the distributed computing system in accordance with an embodiment of the invention.

A process of executing a distributed operation, such as a network service operation, in the distributed computing system 100 in accordance with an embodiment of the invention is described with reference to a process flow diagram of FIG. 6. The network service operation may include, but not limited to, a deployment of new network service, an expansion of a network service into a particular geographical area, upgrading of a network service, and a termination of a network service. In the example illustrated in FIG. 6, it is assumed that the distributed operation is the deployment of a new network service.

The process begins at step 602, where a user selection of a distributed operation descriptor for the distributed operation to be executed in the distributed computing system, such as a network service descriptor for a network service to be deployed in the distributed computing system, is received at the central orchestrator 110. In embodiment, a user may use a user interface at a user device to access the orchestration server 102 to select the distributed operation descriptor among a list of distributed operation descriptors that are available for execution in the distributed computing system 100.

Next, at step 604, in response to the user selection, the selected distributed operation descriptor is retrieved from the distributed operation catalog 114 by the central orchestrator 110. In an embodiment, a name or identification of the selected distributed operation descriptor may be used to find the selected distributed operation descriptor in the distributed operation catalog 114.

Next, at step 606, the distributed operation descriptor is parsed by the central orchestrator 110 to find the first/next function entry in the distributed operation descriptor to be processed. In an embodiment, the first entry is the topmost entry in the distributed operation descriptor in a section of the distributed operation descriptor that includes function entries, e.g., under a node template section. However, in other embodiments, the first entry may be a different entry than the topmost entry in the function section of the distributed operation descriptor.

Next, at step 608, the first/next function entry in the distributed operation descriptor is selected to be processed by the central orchestrator 110. Next, at step 610, a determination is made by the central orchestrator 110 whether the function entry is a VNF entry. If the function entry is a VNF entry, the process proceeds to step 616, where a lifecycle management operation of a VNF, such as a deployment or instantiation of a VNF, is performed using the VNF entry and other information contained in the corresponding VNF descriptor for the VNF, which is fetched from the VNF descriptor catalog 116 by the central orchestrator 110. In an embodiment, the process of performing a lifecycle management operation of a VNF in a target VM-based virtual infrastructure 104 is executed in a conventional manner in accordance with a standard, such as ETSI SOL-001 specification. In particular, the lifecycle management operation of the VNF is performed without the central orchestrator 110 interfacing with any local orchestrator at the target VM-based virtual infrastructure since VM-based virtual infrastructures do not include any local orchestrators. Rather, the central orchestrator 110 directly orchestrates the execution of the lifecycle management operation of the VNF in the target VM-based virtual infrastructure. The process then proceeds to step 620.

However, if the function entry is not a VNF entry, the process proceeds to step 612, where a determination is made by the central orchestrator 110 whether the function entry is a CNF entry. If the function entry is a CNF entry, the process proceeds to step 618, where a lifecycle management operation of a CNF, such as a deployment or instantiation of a CNF, is performed using the CNF entry and other information contained in the corresponding CNF descriptor for the CNF, which is fetched from the CNF descriptor catalog 118. As part of the process of performing a lifecycle management operation of a CNF, property overrides may be made by the central orchestrator 110 as needed before commands are sent to the local orchestrator of a target container-based virtual infrastructure in the distributed computing system 100 to delegate the orchestration of the CNF deployment. The process of performing a lifecycle management operation of a CNF is further described with reference to FIGS. 7A and 7B, which show a process flow diagram of such a process. After step 618, the process then proceeds to step 620.

However, if the entry is also not a CNF entry, the process proceeds to step 614, where an error message is reported by the central orchestrator 110. In an embodiment, the central orchestrator 110 may send the error message to the requesting source, e.g., UI of a user device. The process then comes to an end.

If the process of performing a lifecycle management operation of a VNF or a CNF has been performed, then, at step 620, a determination is made by the central orchestrator 110 whether the current function entry is the last entry in the distributed operation descriptor. If the current function entry is not the last entry in the distributed operation descriptor, the process proceeds back to step 608, where the next function entry in the network service descriptor is selected to be processed. However, if the current function entry is the last function entry in the distributed operation descriptor, the process comes to an end.

Figures 7A, 7B:
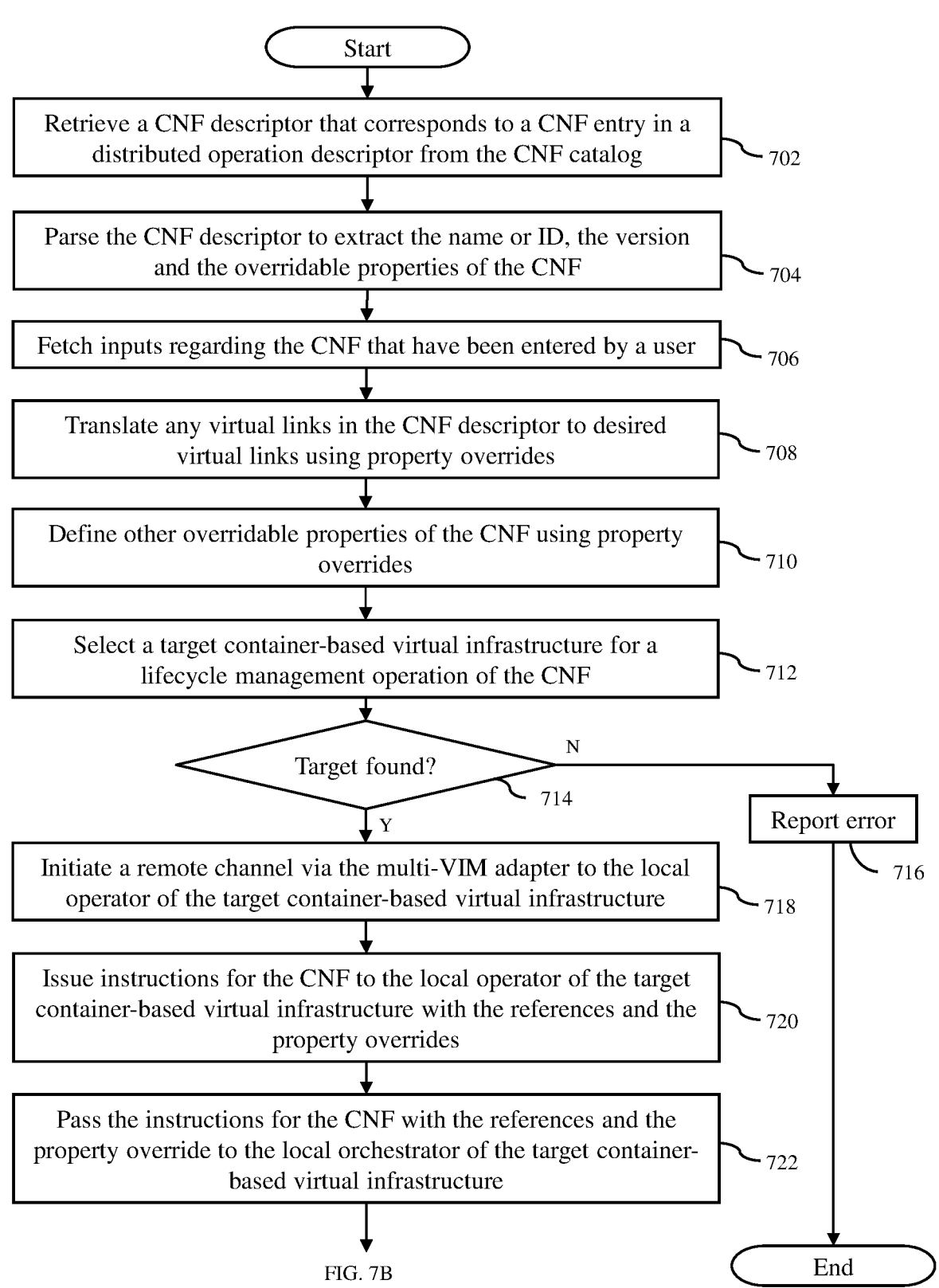
FIGS. 7A and 7B show a process flow diagram of a process of performing a lifecycle management operation of a CNF, such as deploying or instantiating a CNF in a container-based virtual infrastructure of the distributed computing system, in accordance with an embodiment of the invention.
Figure 7B:
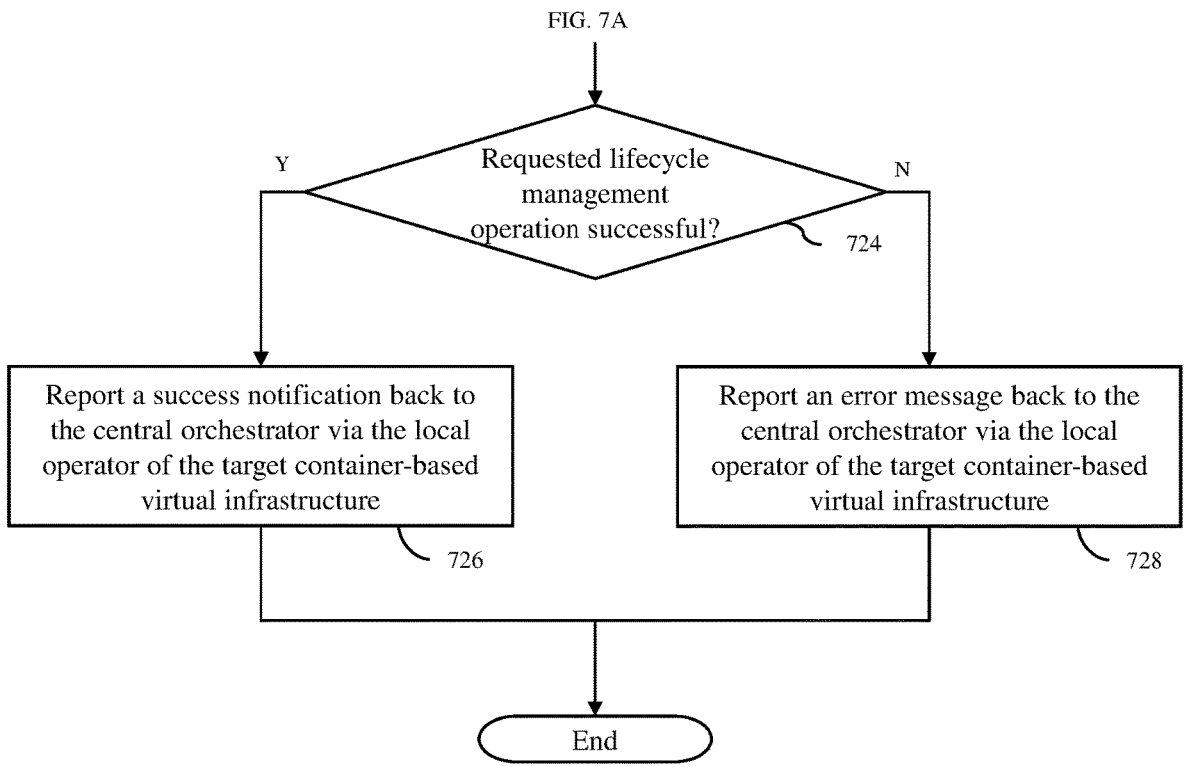

A process of performing a lifecycle management operation of a CNF, such as deploying or instantiating a CNF in a container-based virtual infrastructure of the distributed computing system 100, in accordance with an embodiment of the invention is described with reference to a process flow diagram of FIGS. 7A and 7B. The process begins at step 702, where a CNF descriptor that corresponds to a CNF entry in a distributed operation descriptor is retrieved from the CNF catalog 118 by the central orchestrator 110.

Next, at step 704, the CNF descriptor is parsed by the central orchestrator 110 to extract the name or ID of the CNF descriptor, the version of the CNF descriptor and the overridable properties of the CNF. The name or ID and version of the CNF descriptor may be used to confirm that the correct CNF descriptor is being processed.

Next, at step 706, inputs regarding the CNF entered by a user are fetched by the central orchestrator 110. The inputs may be entered by the user using a user interface of a user device connected to the central orchestrator 110. The user inputs may be received in response to a request from the central orchestrator 110, in accordance with the inputs defined in the CNF descriptor, in step 504, for the user to enter the user inputs into the user interface of the user device for the CNF. In an embodiment, a menu of user inputs may be presented to the user for user selection. These user inputs may include, but not limited to, choice of infrastructure components (e.g., virtual local area network ID and hyper-converged storage ID), capacity details, repository and secrets.

Next, at step 708, any virtual links in the CNF descriptor are translated by the central orchestrator 110 to desired virtual links using property overrides. As an example, if the CNF descriptor specifies a network, the name of the network may be entered using a property override so that the CNF is connected to the desired network when deployed. As another example, if the CNF descriptor specifies a storage, the name of the storage may be entered using a property override so that the CNF is connected to the desired storage when the CNF is deployed. It is assumed here that network and storage are overridable properties of the CNF.

Next, at step 710, other overridable properties of the CNF may be defined by the central orchestrator 110 using property overrides. As an example, these overridable properties of the CNF may be defined or substituted to desired settings, parameters or values using property overrides. In some scenarios, these desired settings, parameters or values may be provided as user inputs. In other scenarios, these desired settings, parameters or values may be provided by the central orchestrator 110 based on settings, parameters or values needed for the distributed operation being executed or for one or more of the other VNFs and/or CNFs involved in the distributed operation. In some embodiments, the overridable properties may be set to complex objects that includes one or more nested information, which may be settings, parameters and/or values.

Next, at step 712, a target container-based virtual infrastructure 106 in the distributed computing system 100 is selected for a lifecycle management operation of the CNF. If the CNF is already deployed at a container-based virtual infrastructure, a database of deployed CNFs in the distributed computing system 100, which may be stored in any non-volatile storage accessible by the central orchestrator 110, may be searched to locate the container-based virtual infrastructure. If the CNF is being deployed, a target container-based virtual infrastructure in the distributed computing system 100 in which to deploy the CNF is selected by executing a best fit algorithm by the central orchestrator 110. The best fit algorithm operates to match the requirements of the CNF deployment with the available container-based virtual infrastructures in the distributed computing system 100 to find the target container-based virtual infrastructure, which may depend on resource requirements of the CNF and/or preferences of the user.

Next, at step 714, a determination is made by the central orchestrator 110 whether the target container-based virtual infrastructure 106 for the CNF deployment has been found. If the target container-based virtual infrastructure for the CNF deployment has not been found among the available container-based virtual infrastructures, the process proceeds to step 716, where an error message is reported by the central orchestrator 110. In an embodiment, the central orchestrator may send the error message to the requesting source, e.g., the user interface of a user device. The process then comes to an end.

However, if the target container-based virtual infrastructure 106 for the CNF deployment has been found, the process proceeds to step 718, where a remote channel via the multi-VIM adapter 112 to the local operator 144 of the target container-based virtual infrastructure 106 is initiated by the central orchestrator 110.

Next, at step 720, instructions for the CNF are issued to the local operator 144 of the target container-based virtual infrastructure 106 with the references and the property overrides so that the lifecycle management operation of the CNF can be executed in the target container-based virtual infrastructure.

Next, at step 722, the instructions for the CNF with the references and the property override are passed to the local orchestrator 142 of the target container-based virtual infrastructure 106 from the local operator 144 of that target container-based virtual infrastructure. In response, the local orchestrator will try to execute the requested lifecycle management operation of the CNF using the references and the property overrides.

Next, at step 724, a determination is made by the local operator 144 of the target container-based virtual infrastructure 106 whether the requested lifecycle management operation was successfully executed by the local orchestrator 142. In an embodiment, a notification from the local orchestrator is sent to the local operator of the target container-based virtual infrastructure when the requested operation was either successfully executed or has failed due to any issues during the execution. If the requested operation was successfully executed, the process proceeds to step 726, where a success notification is reported back to the central orchestrator 110 via the local operator 144 of the target container-based virtual infrastructure 106. The process then comes to an end.

However, if the requested lifecycle management operation was not successfully executed, the process proceeds to step 728, where an error message is reported back to the central orchestrator 110 via the local operator 144 of the target container-based virtual infrastructure 106. The process then comes to an end.

Embodiments of the orchestration scheme of the distributed computing system 100 described herein allows resource sharing via setting overridable properties that will be taken as property overrides by the $3^{rd}$ party orchestrators, i.e., the local orchestrators 142 of the container-based virtual infrastructures 106, and applied accordingly. The setting of some of these overridable properties requires user input to the central orchestrator 110 at the time of onboarding, which are then translated into property overrides during the dispatch to the corresponding native orchestrator, i.e., the $3^{rd}$ party orchestrator. This approach relieves the user from providing these inputs at multiple places.

In addition, embodiments of the orchestration scheme of the distributed computing system 100 provide a solution that is scalable. The main central orchestrator 110 does not maintain any remodeling or data relevant to remote or $3^{rd}$ party container-based virtual infrastructures. The main central orchestrator 110 also does not maintain any state of the entities that reside with the $3^{rd}$ party orchestrators, which are maintained at the $3^{rd}$ party container-based virtual infrastructures. Only the metadata and property overrides are kept with the main central orchestrator 110 and used as directive during the dispatch to the $3^{rd}$ party orchestrators.

Furthermore, given that there is no remodeling in embodiments of the orchestration scheme of the distributed computing system 100, the main central orchestrator 110 does not have to be rebuilt or upgraded frequently with newer $3^{rd}$ pry orchestrators since the main central orchestrator does not really attempt to understand the relevant $3^{rd}$ party technology, nor does main central orchestrator try to maintain states or models.

Although embodiments of the invention have been described to process distributed operation requests that refer to one or more CNFs and/or one or more VNFs, these embodiments may be extended to handle distributed operation requests that may also refer to one or more Physical Network Functions (PNFs). For such a distributed operation request, the central orchestrator 110 can be configured to handle each PNF using a known method in a physical infrastructure, similar to the management of each VNF, as described above.

Figure 8:
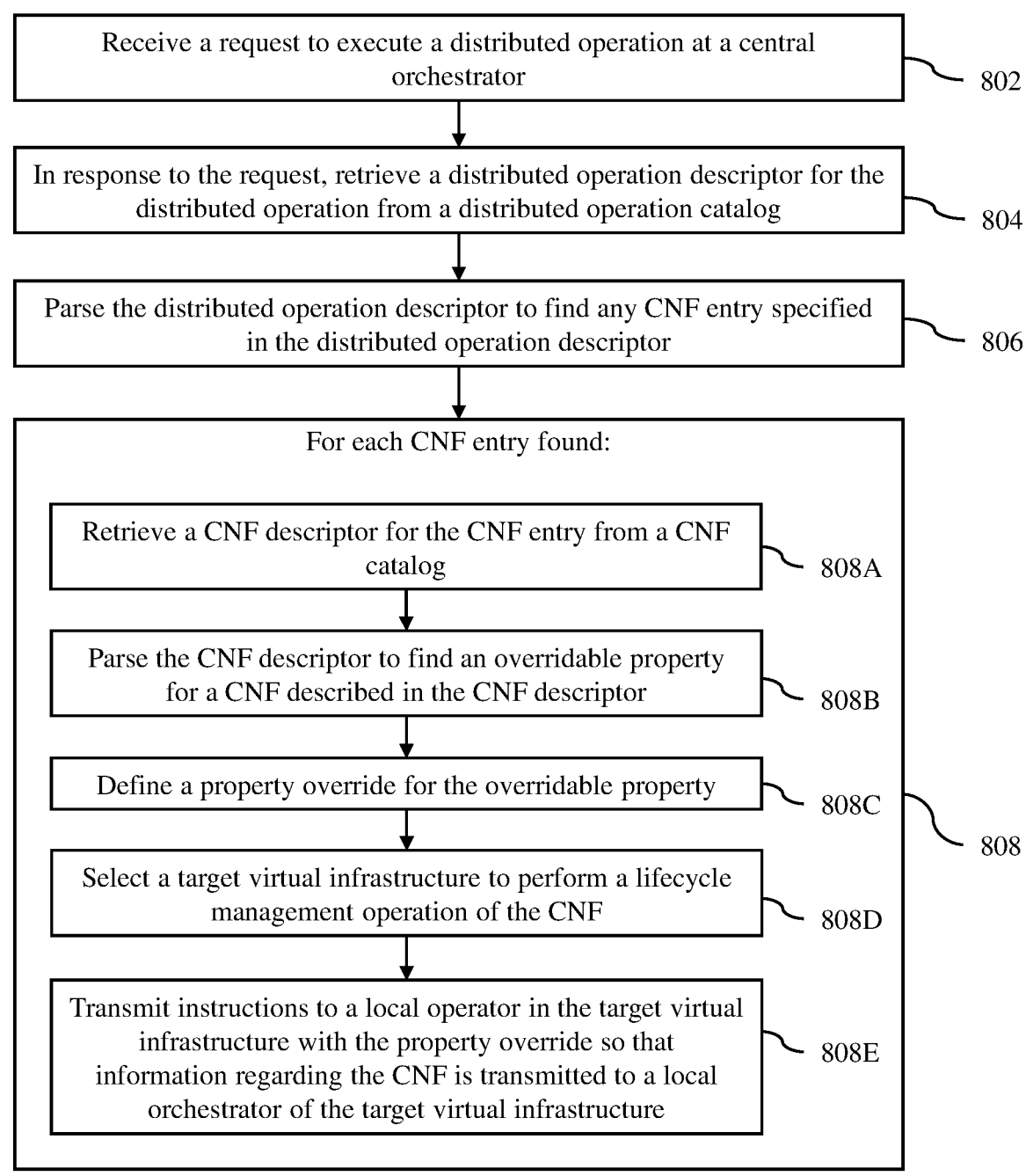
FIG. 8 is a process flow diagram of a computer-implemented method for orchestrating distributed operations to be executed in a distributed computing system with multiple virtual infrastructures in accordance with an embodiment of the invention.

A computer-implemented method for orchestrating distributed operations to be executed in a distributed computing system with multiple virtual infrastructures in accordance with an embodiment of the invention is described with reference to a flow diagram of FIG. 8. At block 802, a request to execute a distributed operation at a central orchestrator is received. At block 804, in response to the request, a distributed operation descriptor for the distributed operation is retrieved from a distributed operation catalog. At block 806, the distributed operation descriptor parsed to find any CNF entry specified in the distributed operation descriptor. At block 808, for each CNF entry found in the distributed operation descriptor, sub-blocks 808A-808E are performed. At block 808A, a CNF descriptor for the CNF entry is retrieved from a CNF catalog. At block 808B, the CNF descriptor is parsed to find an overridable property for a CNF described in the CNF descriptor. At block 808C, a property override for the overridable property is defined. At block 808D, a target virtual infrastructure is selected from the multiple virtual infrastructures of the distributed computing system to perform a lifecycle management operation of the CNF. At block 808E, instructions from the central orchestrator are transmitted to a local operator in the target virtual infrastructure with the property override so that information regarding the CNF is transmitted to a local orchestrator of the target virtual infrastructure in order for the local orchestrator to perform the lifecycle management operation of the CNF at the target virtual infrastructure using the property override.

In addition, although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for orchestrating distributed operations to be executed in a distributed computing system with multiple virtual infrastructures, the method comprising:

receiving a request to execute a distributed operation at a central orchestrator;

in response to the request, retrieving a distributed operation descriptor for the distributed operation;

based at least in part on a first function entry of the distributed operation descriptor being a Virtual Network Function (VNF) entry, executing a lifecycle management operation of a VNF based on a VNF descriptor associated with the VNF entry; and based at least in part on a second function entry of the distributed operation description being a Cloud-Native Network Function (CNF) entry, executing a lifecycle management operation of a CNF based on a CNF descriptor associated with the CNF entry, including defining a property override for any overridable property found in the CNF descriptor, wherein executing the lifecycle management operation of the CNF includes transmitting information regarding the CNF to a local orchestrator of a target virtual infrastructure in order for the local orchestrator to perform the lifecycle management operation of the CNF at the target virtual infrastructure using the property override.

2. The method of claim 1, wherein the CNF descriptor includes at least one reference to an intent file stored in a repository that is accessible by the local orchestrator of the target virtual infrastructure and is not accessible by the central orchestrator.

3. The method of claim 1, further comprising transmitting a success notification from the local operator at the target virtual infrastructure back to the central orchestrator when the lifecycle management operation of the CNF at the target virtual infrastructure was successful.

4. The method of claim 1, wherein the property override for the overridable property is defined using a user input.

5. The method of claim 1, wherein the overridable property is a virtual link of the CNF and wherein the property override for the overridable property is defined by adding a virtual link name to the overridable property.

6. The method of claim 5, wherein the virtual link is a network or a storage associated with the CNF.

7. The method of claim 1, wherein executing the lifecycle management operation of the VNF includes directly orchestrating the lifecycle management operation of the VNF at a second target virtual infrastructure without interfacing with any local orchestrator at the second target virtual infrastructure.

8. A non-transitory computer-readable storage medium containing program instructions for orchestrating distributed operations to be executed in a distributed computing system with multiple virtual infrastructures, wherein execution of the program instructions by one or more processors of a computer system causes the one or more processors to perform steps comprising:

receiving a request to execute a distributed operation at a central orchestrator;

in response to the request, retrieving a distributed operation descriptor for the distributed operation;

parsing the distributed operation descriptor to find function entries in the distributed operation descriptor;

based at least in part on a first function entry of the distributed operation descriptor being a Virtual Network Function (VNF) entry, executing a lifecycle management operation of a VNF based on a VNF descriptor associated with the VNF entry; and based at least in part on a second function entry of the distributed operation descriptor being a Cloud-Native Network Function (CNF) entry, executing a lifecycle management operation of a CNF based on a CNF descriptor associated with the CNF entry, including defining a property override for any overridable property found in the CNF descriptor, wherein executing the lifecycle management operation of the CNF includes transmitting information regarding the CNF to a local orchestrator of a target virtual infrastructure in order for the local orchestrator to perform the lifecycle management operation of the CNF at the target virtual infrastructure using the property override.

9. The non-transitory computer-readable storage medium of claim 8, wherein the CNF descriptor includes at least one reference to an intent file stored in a repository that is accessible by the local orchestrator of the target virtual infrastructure and is not accessible by the central orchestrator.

10. The non-transitory computer-readable storage medium of claim 8, wherein the steps further comprise transmitting a success notification from the local operator at the target virtual infrastructure back to the central orchestrator when the lifecycle management operation of the CNF at the target virtual infrastructure was successful.

11. The non-transitory computer-readable storage medium of claim 8, wherein the property override for the overridable property is defined using a user input.

12. The non-transitory computer-readable storage medium of claim 8, wherein the overridable property is a virtual link of the CNF and wherein the property override for the overridable property is defined by adding a virtual link name to the overridable property.

13. The non-transitory computer-readable storage medium of claim 12, wherein the virtual link is a network or a storage associated with the CNF.

14. The non-transitory computer-readable storage medium of claim 8, wherein executing the lifecycle management operation of the VNF includes directly orchestrating the lifecycle management operation of the VNF at a second target virtual infrastructure without interfacing with any local orchestrator at the second target virtual infrastructure.

15. A system comprising:

memory; and at least one processor configured to:

receive a request to execute a distributed operation at a central orchestrator;

in response to the request, retrieve a distributed operation descriptor for the distributed operation;

parse the distributed operation descriptor to find function entries in the distributed operation descriptor;

based at least in part on a first function entry of the distributed operation descriptor being a Virtual Network Function (VNF) entry, execute a lifecycle management operation of a VNF based on a VNF descriptor associated with the VNF entry; and based at least in part on a second function entry of the distributed operation descriptor being a Cloud-Native Network Function (CNF) entry, execute a lifecycle management operation of a CNF based on a CNF descriptor associated with the CNF entry, including defining a property override for any overridable property found in the CNF descriptor, wherein executing the lifecycle management operation of the CNF includes transmitting information regarding the CNF to a local orchestrator of a target virtual infrastructure in order for the local orchestrator to perform the lifecycle management operation of the CNF at the target virtual infrastructure using the property override.

16. The system of claim 15, wherein the CNF descriptor includes at least one reference to an intent file stored in a repository that is accessible by the local orchestrator of the target virtual infrastructure and is not accessible by the central orchestrator.

17. The system of claim 15, wherein the at least one processor is configured to use a user input as the property override for the overridable property.

18. The system of claim 15, wherein the overridable property is a virtual link of the CNF and wherein the at least one processor is configured to add a virtual link name to the overridable property to define the property override for the overridable property.

19. The system of claim 18, wherein the virtual link is a network or a storage associated with the CNF.

20. The system of claim 15, wherein executing the lifecycle management operation of the VNF includes directly orchestrating the lifecycle management operation of the VNF at a second target virtual infrastructure without interfacing with any local orchestrator at the second target virtual infrastructure.

* * * * *